United States Patent
Imbimbo et al.

(10) Patent No.: US 8,107,480 B2
(45) Date of Patent: Jan. 31, 2012

(54) METHOD, ARRANGEMENT, NODE AND ARTICLE FOR ENHANCING DELIVERY CAPACITY IN A TELECOMMUNICATIONS NETWORK BY TRANSCODING TRAFFIC INTO REQUESTED QUALITY OF SERVICE (QOS)

(75) Inventors: Amedeo Imbimbo, Caivano (IT); Raffaele De Santis, Mercato San Severino (IT)

(73) Assignee: Telefonaktiebolaget L M Ericsson (PUBL)

( * ) Notice: Subject to any disclaimer, the term of this patent is extended or adjusted under 35 U.S.C. 154(b) by 0 days.

(21) Appl. No.: 12/521,704

(22) PCT Filed: Dec. 28, 2006

(86) PCT No.: PCT/SE2006/001508
§ 371 (c)(1), (2), (4) Date: Feb. 8, 2010

(87) PCT Pub. No.: WO2008/082329
PCT Pub. Date: Jul. 10, 2008

(65) Prior Publication Data
US 2010/0142389 A1    Jun. 10, 2010

(51) Int. Cl.
*H04L 12/28* (2006.01)
(52) U.S. Cl. .................................. 370/395.21; 370/389
(58) Field of Classification Search ................ 370/332, 370/395.21, 389, 349, 465, 466
See application file for complete search history.

(56) References Cited

U.S. PATENT DOCUMENTS

2004/0139088 A1*  7/2004  Mandato et al. ............. 707/100
2005/0025064 A1*  2/2005  Chang et al. ................. 370/252

* cited by examiner

*Primary Examiner* — Brenda H Pham

(57) ABSTRACT

Methods and apparatuses to enhance delivery capacity for traffic in a communication network are disclosed. Traffic is received to a Delivery Function with originally coded Quality of Services (QoS). A specification of requested QoS is received to the Delivery Function. The originally coded QoS is established to be higher than the requested QoS. The received traffic is transcoded into requested QoS. Optionally, the traffic is buffered with originally coded QoS and at request, the buffered traffic is retrieved.

19 Claims, 6 Drawing Sheets

METHOD, ARRANGEMENT, NODE AND ARTICLE FOR ENHANCING DELIVERY CAPACITY IN A TELECOMMUNICATIONS NETWORK BY TRANSCODING TRAFFIC INTO REQUESTED QUALITY OF SERVICE (QOS)

TECHNICAL FIELD

The present invention relates to methods and arrangements to enhance delivery capacity for traffic in a telecommunication network.

BACKGROUND

Optimized bandwidth consumption is a well known problem in communication networks of today. Various solutions to keep down bandwidth consumption exist. The problem with unevenly distributed data is identified in the International Patent Application PCT/IB02/03353. The problem is solved by a user selecting delivery from at least two delivery classes: "deliver NOW" in real time or a specified "time delay delivery" whereby the "time delay delivery" class allows the network to send content at a time when the network is least utilized. In the US application 2002/0172222 a system administrator requests packet filtering based upon selected active users or active applications. A bandwidth history database is compiled from bandwidth usage data associated with multiple entities within a data processing system. In response to a requested action within the data processing system, bandwidth usage for the requested action can be predicted with reference to the bandwidth history database in order to change bandwidth consumption behaviour. The above solutions present drawbacks such as preventing needed delivery of services to receiving users, at any time.

Also within the Lawful Interception concept high bandwidth consumption problems arise when high bandwidth consuming Content of Communication like, for instance, IP-TV or broadcasting data is to be delivered to a monitoring function.

FIG. 1 belongs to prior art and discloses a solution for monitoring of Interception Related Information IRI and Content of Communication CC for the same target. The different parts used for interception belong to prior art and are disclosed in current Lawful Interception standards (see 3GPP TS 33.108 and 3GPP TS 33.107—Release 7). A Law Enforcement Monitoring Facility LEMF is connected to three Mediation Functions respectively for ADMF, DF2, DF3 i.e. an Administration Function ADMF and two Delivery Functions DF2 and DF3. The Administration Function and the Delivery Functions are each one connected to the LEMF via standardized handover interfaces HI1-HI3, and connected via interfaces X1-X3 to an Intercepting Control Element ICE in a telecommunication system. Together with the delivery functions, the ADMF is used to hide from ICEs that there might be multiple activations by different Law Enforcement Agencies. The messages sent from LEMF to ADMF via HI1 and from the ADMF to the network via the X1 interface comprise identities of a target that is to be monitored. The Delivery Function DF2 receives Intercept Related Information IRI from the network via the X2 interface. DF2 is used to distribute the IRI to relevant Law Enforcement Agencies via the HI2 interface. The Delivery Function DF3 receives Content of Communication CC, i.e. speech and data, on X3 from the ICE. Requests are also sent from the ADMF to a Mediation Function MF3 in the DF3 on a Handover Interface HI_3. The requests sent on HI_3 are used for activation of Content of Communication, and to specify detailed handling options for intercepted CC. In Circuit Switching, DF3 is responsible for call control signaling and bearer transport for an intercepted product. Intercept Related Information IRI, received by DF2 is triggered by Events that in Circuit Switching domain are either call related or non-call related. In Packet Switching domain the events are session related or session unrelated.

The access method for the delivering of Packet Data GPRS Support Node GSN Intercept Product is based on duplication of packets without modification at 3G GSN. The duplicated packets with additional information are sent to DF3 for further delivery via a tunnel. In currently provided DF3 architecture in the lawful interception solution, when a LEMF is interested in receiving the service contents of the target subscriber, the LEMF must be able to receive and decode high bandwidth consuming Content of Communication for service like IP-TV or broadcasting, which may be as high as Gbits of information per second. This requires the LEMF to handle/consume high bandwidth also when media content is considered as non-meaningful for LI investigation purposes (e.g. encrypted attachments in MMS/SMS, bandwidth and processing capacity consuming multimedia contents).

SUMMARY

The present invention relates to problems to limit bandwidth consumption and not overload the system while yet open up for full delivery of services if needed. A further problem is unnecessary high buffered traffic storage amount, for example when a receiving monitoring facility does not operate in real-time.

A purpose with the invention is to bandwidth optimize the use of the delivery interface by introducing an enhanced delivery mechanism.

The solution to the problem is to delimit the Quality of Services QoS to a maximum sustainable level for the delivery interface and, optionally, if the delimited QoS is lower than the original QoS, buffer the original traffic for later usage and at request, retrieving the buffered traffic.

The solution to the problem more in detail is a method to enhance delivery capacity for traffic in a communication network, comprising:

Receiving to a Delivery Function, the requested traffic with originally coded Quality of Services QoS.

Receiving to the Delivery Function, a specification of requested QoS.

establishing that the requested coded QoS is lower than originally the QoS;

transcoding the received traffic from original to requested QoS.

Optionally, buffering traffic with originally coded Quality of Services QoS and at request, retrieving the buffered traffic.

The further mentioned problem i.e. reduction of buffered storage amount e.g. when a traffic receiving monitoring facility does not operate in real time is solved by a filtering mechanism that makes storage needs of buffered traffic significantly lower. Yet a further problem is to ensure that possible buffered contents are not altered by unauthorized entities. This problem is solved for example by techniques like requirement of digital signatures to access stored data.

A purpose with the invention is to optimize usage of the delivery interface and prevent high bandwidth consumption unless necessary for monitoring aims. This purpose and others are achieved by methods, arrangements, nodes, systems and articles of manufacture.

Examples of advantages of the invention are as follows:
- Enrichment of the LI functionality with video and audio transcoding features in order to have an optimized use of the HI3 interface bandwidth.
- Enrichment of the LI functionality with the media compression techniques for removing the media content considered as non-meaningful for LI investigation purposes for example, encrypted attachments in MMS/SMS, bandwidth and processing capacity consuming multimedia contents.
- The LI standards require that the QoS towards the delivery function provided by the network must be of at least the level that the network provides to the target. This is fulfilled also with this solution, since the intercepted CC is buffered with the QoS offered by the network and available to be retrieved from the agency.
- Possibility to provide the Video Transcoding features in conjunction with the LI functionality.
- Promote the usage of specified Service-aware products as supporting functions in LI gateway. Due to the need to differentiate the QoS on service basis this product shall serve to single the different service contents from a unique data stream.
- No influence on the interception domain, i.e. on the elements in the network.
- Receipt of low Qos Content of Communication make storage needs significantly lower.
- Best fitting of the Agency's expectations (set on warrant basis) in terms of the trade-off among the expected intelligibility of the interception (i.e., minimum desired QoS) and the capacity/bandwidth endured load on the MC resources.

The invention will now be described more in detail with the aid of preferred embodiments in connection with the enclosed drawings.

DETAILED DESCRIPTION

3GPP applies separation of signalling and media planes with the introduction of split architecture for the Mobile Switching Centre MSC. The MSC is split into an MSC server and a Media Gateway MGW. The split architecture was introduced in Release 4 of the 3GPP specifications. Media such as video and voice is handled in bearer domain and sent via the MGW while signalling is handled by the MSC Server.

Figure 1:
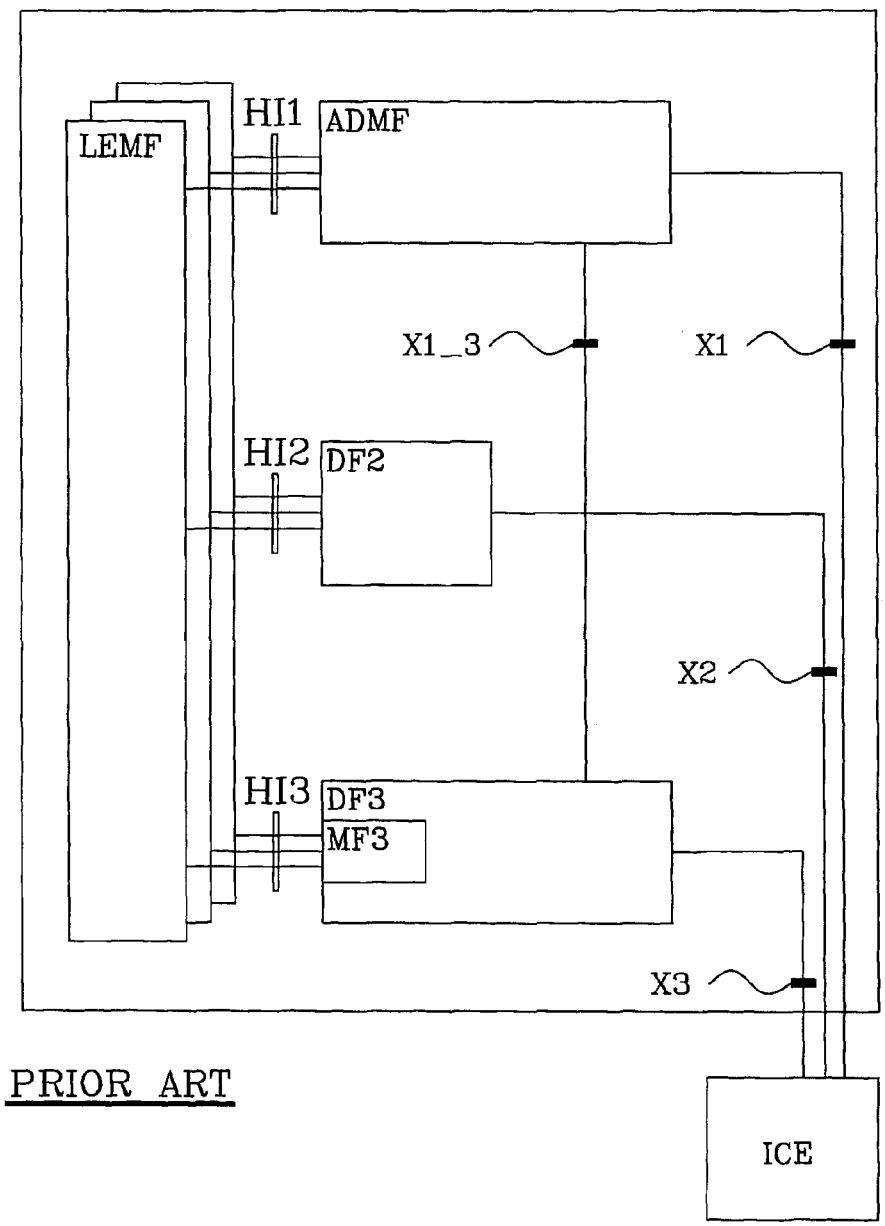
FIG. 1 belongs to prior art and discloses a block schematic illustration of interception configuration items attached to an Intercepting Control Element.
Figure 2:
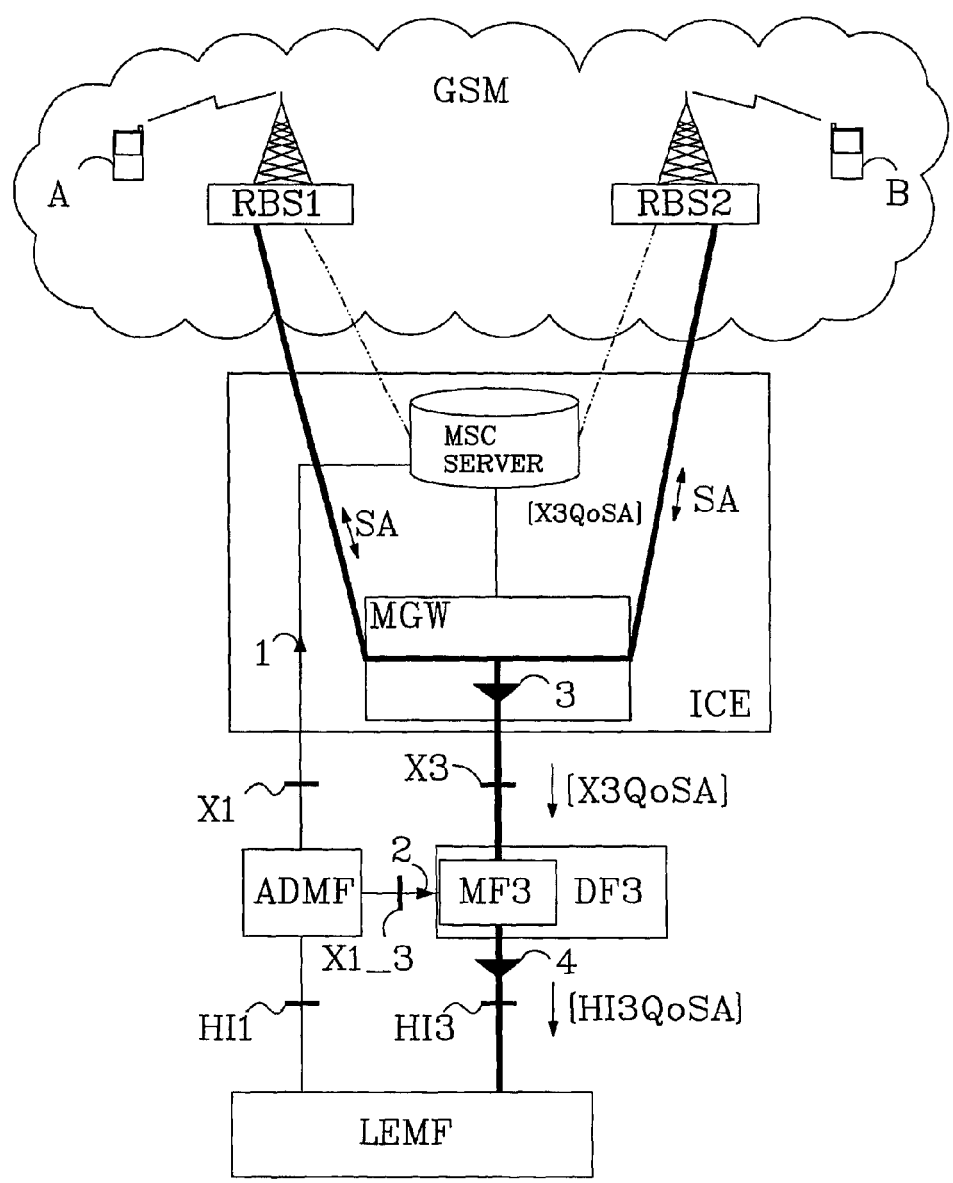
FIG. 2 discloses a block schematic illustration of an Intercept Control element that is split into an MSC server and a Media Gateway wherein traffic is monitored from the media Gateway.

FIG. 2 discloses a delivery configuration to the Law Enforcement Monitoring Facility LEMF when monitoring a Circuit Switched call. The figure shows an Intercepting Control Element ICE that comprises an MSC Server and a Media Gateway MGW. In this example the ICE is connected to two Radio Base Station RBS1 and RBS2 in a GSM Access Network wherein a mobile station A (subscriber) is radio linked to RBS1 and a mobile station B is radio linked to RBS2. A voice session is set up between A and B. Signalling information used to set up the session is transported via the MSC Server between A and B. The signalling information is shown in the figure with divided lines. Traffic, such as speech SA in this example, is sent via the Media Gateway MGW. The earlier mentioned (see FIG. 1) Law Enforcement Monitoring Facility LEMF is attached to the Media Gateway via the Mediation Function MF3 in the delivery function DF3. If requested, a copy of the traffic will be sent from the MGW to the LEMF. The request is sent from LEMF to the MSC Server via the X1 interface. MSC server will setup the multiparty in the MGW for the duplication of Content of Communication CC on the X3 interface. To be noted is that speech from A to B and speech from B to A will be sent on separate stub-lines between the MF3 and the LEMF, and cause download of the Handover Interface HI3. The traffic SA sent between A to B comprises a certain coded level of Quality of Services QoS, so called originally coded QoS. The originally coded QoS for the speech SA is referred to in FIG. 2 as [X3QoSA]. According to the invention an agency have the possibility to request a Quality of Service representing a maximum sustainable level for the Handover Interface HI3, a so called requested coded Quality of Services. The requested QoS level can be lower than the originally coded level of QoS. The requested QoS for the signal SA is referred to in FIG. 2 as [HI3QoSA]. The request for a certain coded QoS level is sent from LEMF on HI1 to ADMF and forwarded from ADMF on X1_3 to MF3.

A method according to a first embodiment of the invention will now be explained together with FIG. 2. In this exemplified embodiment, a circuit switched call has been set up between subscriber A and B and speech SA is transported via the Media Gateway MGW in the ICE. The method comprises the following steps:

A request 1 to activate interception of subscriber A is sent from the LEMF to the MSC Server via the ADMF. The request 1 comprises a target identity related to subscriber A.

After receiving the request, the below information will be transferred via the MGW from the MSC Server to the Delivery Function DF3. This signaling info are transferred to DF3 by MSC Server. In fact, as referred in 33.107 for the case of CS split architecture, the X3 interface consists of a signaling part (MSC server transfers to DF3 the target and correlation info of the interception case) and of payload part (transferred to DF3 via MGW). The following information will be transferred:

- target identity (MSISDN, IMSI or IMEI).
- The target location (if available) or the IAs in case of location dependent interception.
- Correlation number (IRI<->CC).
- Direction indication (Signal from target or signal to target)

The above control information is needed to allow DF3 in correlating the received CC payload to the proper warrants and making accordingly the HI3 ISDN calls to LEMF. On X3, the bearer (a pure bearer copy of the transmitted and received content of communication of the target subscriber) is sent from the MGW to DF3 that transcodes it in the HI3 call towards LEMF.

A copy 3 of the speech SA with originally coded Quality of Services is sent from the MGW to the Delivery Function DF3.

Up until now the method has followed Lawful Interception according to standards referred to in the background part of this application. The method according to invention comprises the following further steps:

According to the invention, a signal 2 comprising a specification of requested level of coded Quality of Services QoS is sent from LEMF to MF3 via the ADMF. The requested level is the level representing maximum sustainable QoS level on the Handover Interface. In this example the requested level of QoS is lower than the original level of QoS. While speech sent with originally coded QoS appears with "perfect" speech quality, speech with lower QoS is distorted and may appear with a quality that is "less than perfect" even though usable for monitoring purposes.

The speech 3 coded with original level of QoS [X3QoSA] is received to the Delivery Function DF3 and transcoded in the DF3 to the requested level of QoS [HI3QoSA]. In this example speech is explicitly referred to. In such a case, transcoding examples would be the conversion of PCM payload into Full Rate/Half Rate/Enhanced Full Rate AMR coded content. On the other end and as a more effective example, when intercepting High Speed CS data calls, the payload transcoding function would result in making "simple" CSD calls towards LEMF (so less CS channels to monitoring center compared to HSCSD calls).

The transcoded speech 4 with the requested level of QoS [HI3QoSA] is sent on the Handover Interface HI3 from MF3 to the LEMF. An agency will get access to the traffic from the LEMF.

Figure 3:
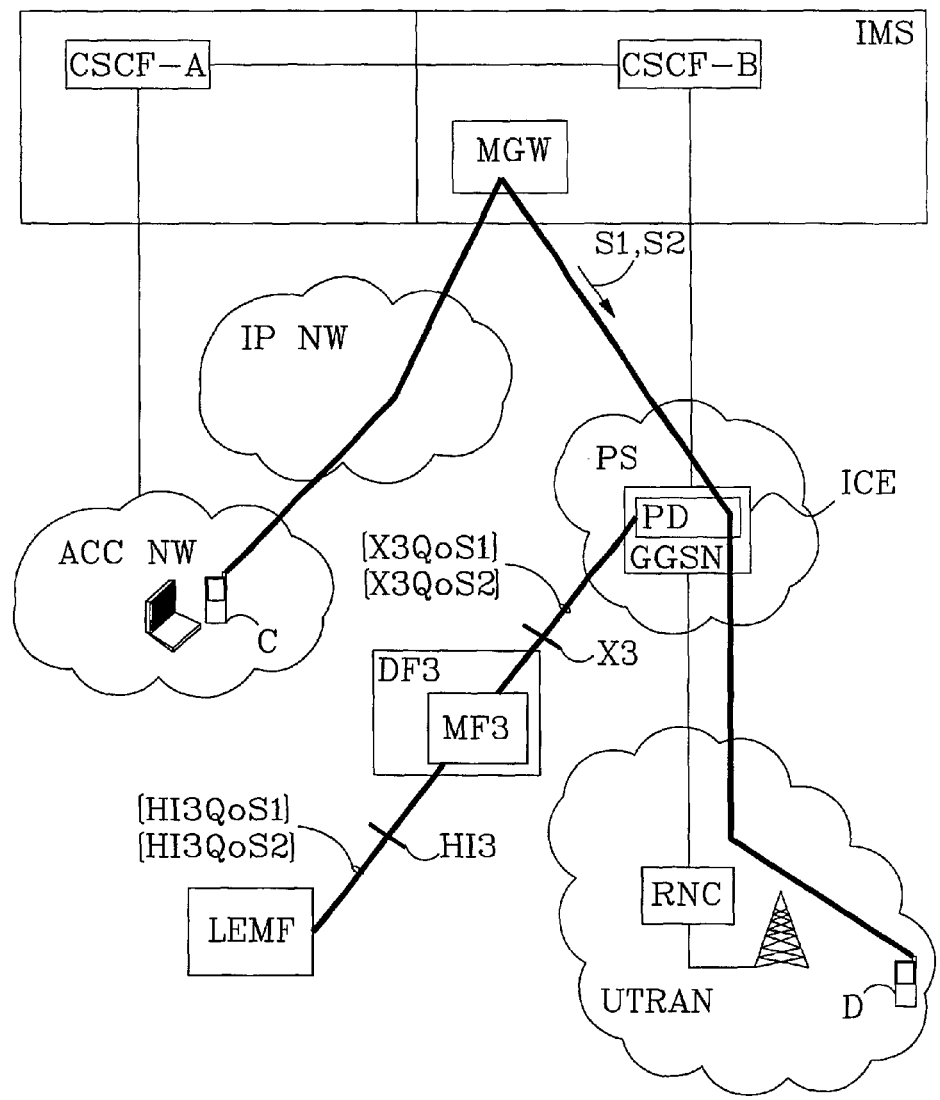
FIG. 3 discloses a block schematic illustration of a monitoring configuration attached to IP Multimedia Subsystem IMS wherein a Gateway GPRS Support Node is acting as Intercept Control element.

Like in 3GPP, signalling and media paths are kept separated in IP Multimedia Subsystems IMS. IMS however goes even further in this separation. The only nodes that need to handle both signalling and media are the IMS terminals; no network node needs to handle both. FIG. 3 discloses in a second embodiment the previous explained LI configuration attached to an IP Multimedia Subsystem IMS. IMS is the technology defined by the Third Generation Partnership Project 3GPP to provide IP Multimedia services over mobile communication networks (3GPP TS 22.228, TS 23.228, TS 24.229, TS 29.228, TS 29.229, TS 29.328 and TS 29.329 Release 5 and Release 6). The IMS makes use of the Session Initiation Protocol SIP to set up and control calls or sessions between user terminals (or user terminals and application servers). The Session Description Protocol SDP, carried by SIP signaling, is used to describe and negotiate the media components of the session. The target identity for multimedia is the SIP URL at the CSCF. Whilst SIP was created as a user-to-user protocol, IMS allows operators and service providers to control user access to services and to charge users accordingly. IP Multimedia services provide a dynamic combination of voice, video, messaging, data, etc. within the same session.

FIG. 3 schematically shows the IMS structure used in the second embodiment of the invention. The IMS in the example comprises Call/Session Control Functions CSCF-A and CSCF-B. The CSCFs are SIP servers and essential nodes in the IMS. A CSCF processes SIP signaling in the IMS network. The CSCF comprises different Call/Session Control Function types such as P-/I-/S-CSCF as defined in the standards but is for the sake of clarity shown in the schematic FIG. 3 as a single node. The bearer domain in the example consists of an access network ACC NW (such as PLMN and PSTN) and an UMTS Terrestrial Radio Access Networks UTRAN and a backbone network IP NW. A transmitting video terminal C is located in the ACC NW while a receiving terminal D is located in the UTRAN network. Two video services S1 and S2 are transported from a terminal attached to C through the IP network via a Media Gateway MGW in the IMS domain, through a Packet Switched network PS, to D in the UTRAN network. A Gateway GPRS Support Node GGSN is located in the Packet Switched PS network. The GGSN acts as Intercepting Control Element ICE. The GGSN comprises a Packet Duplicator PD and the LEMF is attached to the PD via the Mediation/Delivery Function MF3/DF3. The access method for delivering Packet Data GSN Intercept Product is based on duplication of Packets without modification at GGSN. The duplicated packets with additional information in the header are sent to MF3/DF3 for further delivery to LEMF.

Figure 4:
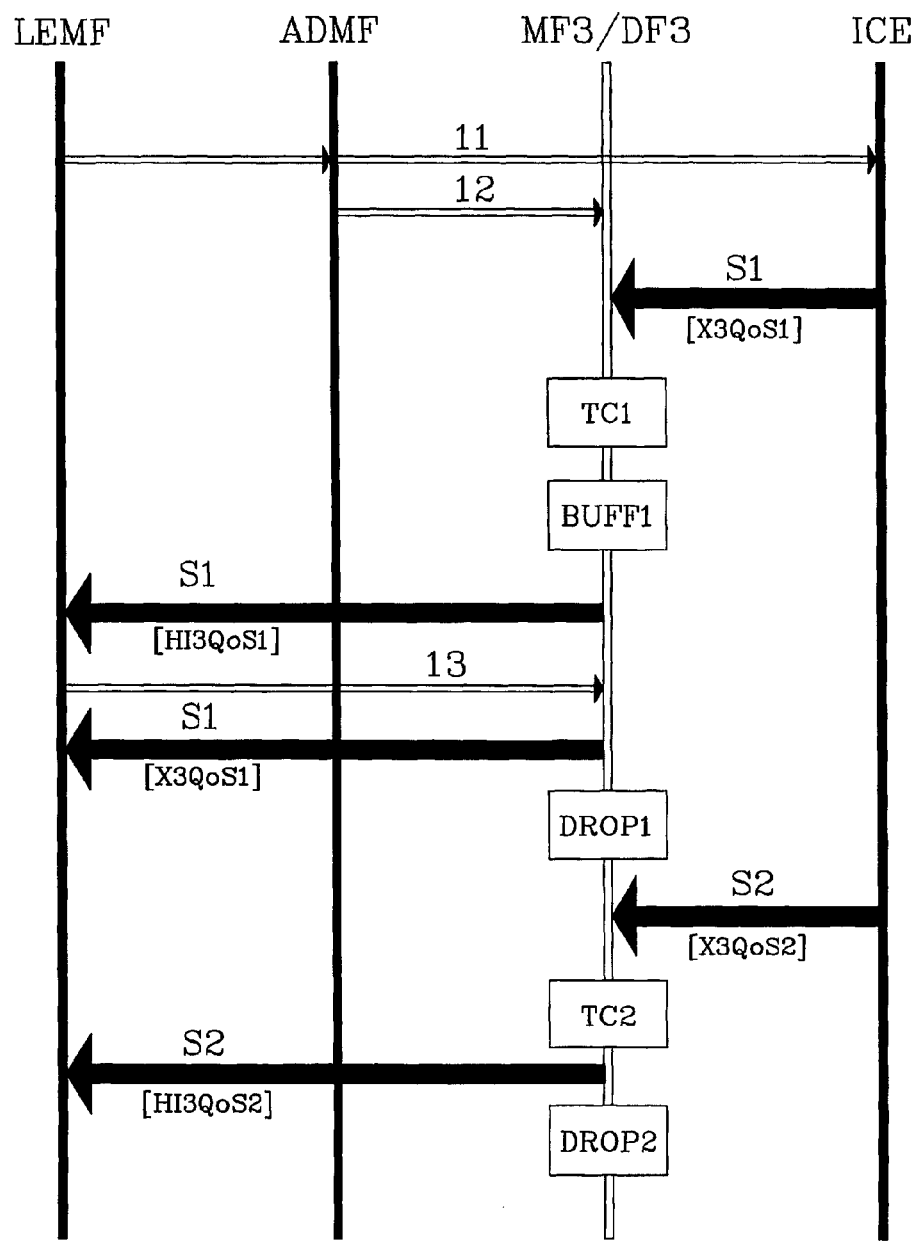
FIG. 4 discloses a signal sequence diagram representing a method Wherein traffic in Packet Switched domain is monitored.

FIG. 4 discloses a signal sequence diagram in which the method according to the second embodiment of the invention is shown. The method in FIG. 4 is to be read together with FIG. 3. The method comprises the following steps:

A request 11 for Lawful Interception activation is sent from LEMF via the ADMF to ICE. The request comprises a target identity i.e. MSISDN—Mobile Station International ISDN Number related to subscriber C. The request in this example also comprises identification of two specific video-streaming services to be observed, i.e. the services S1 and S2. The request further comprises a requested Quality of Services QoS for the services S1 and S2 respectively. The requested QoS in this example is Animated GIF for both S1 and S2. The requested QoS for S1 is in the figure referred to as [HI3QoS1]. The request 11 also comprises a buffering option which in this example is "buffering requested" for S1 and "no buffering request" for S2.

A QoS request 12 is sent from the ADMF to the Mediation Function MF3 in the Delivery Function DF3. The request 12 comprises beyond the target identity, the identities of services S1 and S2 and the requested QoS for the services [HI3QoS1]&[HI3QoS1], i.e. Animated GIF. Also the buffering options are sent in the request 12.

The service S1 is transported via the Packet Duplicator PD from C to D (see FIG. 3). The original QoS [X3QoS1] in this example is AVI-M-PEG.

Packets sent from C to D are duplicated without modification and the Service S1 is forwarded with the original coded [X3QoS1] from PD in the Intercepting Control Element ICE, to the Delivery Function DF3.

A QoS check is performed in DF3. In case the QoS information for S1 is available in the header of the Content of Communication CC, then such info is used by MF3/DF3 to apply the behavior set on warrant basis. Otherwise, MF3/DF3 needs to preliminary inspect the CC and consequently treat it as set on warrant basis.

In this example the requested Quality of Services [HI3QoS1] is lower than the original Quality of Services [X3QoS1] and S1 is consequently transcoded TC1 in the MF3/DF3 into the requested [HI3QoS1] i.e. S1 is transcoded from AVI-M-PEG to Animated GIF.

S1 with original Quality of Services [X3QoS1] is buffered BUFF1, as set on warrant basis, in an MF3 database.

S1 with requested Quality of Services [HI3QoS1] is sent from MF3/DF3 to LEMF where it is observed by an agency.

In this example the agency finds the [HI3QoS1] not to be sufficient for interception purposes (e.g. it is not possible to interpret the meaning of the video signal).

A further request 13 is sent from LEMF to MF3/DF3. The buffered S1 with original Quality of Services [X3QoS1] is hereby requested to be retrieved.

The buffered S1 with original Quality of Services [X3QoS1] is sent on the HI3 from MF3/DF3 to LEMF.

If no other agency has required the CC for the same target, the buffered content will be removed DROP1 from MF3/DF3. As an alternative, if the original QoS was not requested to be retrieved the buffered CC still would have been removed after expiration of a specified time period. The time period may be set in a default manner or set in the request 12 by the requesting agency. The clock hereby starts when S1 [HI3QoS1] is sent from MF3/DF3 to LEMF and expires after the set time has lapsed.

While S1 was requested to be buffered, S2 was requested not to be buffered. FIG. 4 discloses the following further steps regarding the handling of S2:

The service S2 is transported via the Packet Duplicator PD from C to D. The coded QoS for the signal S2 when transported from C to D is called the original QoS and is referred to as [X3QoS2] in the figures. S2 is forwarded with the original coded [X3QoS2] from PD, i.e. from the Intercepting Control Element ICE, to the Delivery Function DF3.

A QoS check is performed in DF3 and [HI3QoS2] is found to be lower than [X3QoS2].

S2 is transcoded TC2 in the MF3/DF3 into the requested [HI3QoS2] i.e. S2 is transcoded from AVI-M-PEG to Animated GIF.

S2 with requested Quality of Services [HI3QoS2] is sent from MF3/DF3 to LEMF without being buffered in MF3/DF3 and as a consequence, S2 is removed DROP2 from MF3/DF3 after sending.

If the agency finds the [HI3QoS2] to be un-sufficient for interception purposes, there will be no possibility to retrieve the original information. The advantage is that no storage consuming buffering has taken place.

The association on warrant basis can be taking into account several HI3QoS specified on a service basis.

As seen in the example above, the buffered CC will be erased from the MF3 database at the expiry of the configured timer, or as an alternative if the LI agency explicitly orders the erasure, for example if CC at the lower QoS is considered sufficient for lawful investigation purposes.

Other services involving video content (e.g., MMS messages with attached video clips) could be required with different "presentations" (QoS). In general, for video services, the agency may require any of the possible conversion as reported in the following table:

TABLE 1

Video-to-Slideshow and Video-to-Video Transcoding

| From | | Animated GIF | MNG | Animation + AMR-NB | Animation + QCELP | Animation + WAV-GSM 6.10 | Animation + WAV-PCM | SMIL + JPEG |
|---|---|---|---|---|---|---|---|---|
| 3GPP | H.263 | ✓ | ✓ | ✓ | ✓ | ✓ | ✓ | ✓ |
|  | MPEG-4 SP | ✓ | ✓ | ✓ | ✓ | ✓ | ✓ | ✓ |
| 3GPP2/ K3G/AMC | H.263 | ✓ | ✓ | ✓ | ✓ | ✓ | ✓ | ✓ |
|  | MPEG-4 SP | ✓ | ✓ | ✓ | ✓ | ✓ | ✓ | ✓ |
| ISMA | MPEG-4 SP | ✓ | ✓ | ✓ | ✓ | ✓ | ✓ | ✓ |
| AVI | M-JPEG | ✓ | ✓ | ✓ | ✓ | ✓ | ✓ | ✓ |
|  | DIVX | ✓ | ✓ | ✓ | ✓ | ✓ | ✓ | ✓ |
|  | MS.RLE | ✓ | ✓ | ✓ | ✓ | ✓ | ✓ | ✓ |
|  | MS.MPEG4 | ✓ | ✓ | ✓ | ✓ | ✓ | ✓ | ✓ |
|  | MPEG4 | ✓ | ✓ | ✓ | ✓ | ✓ | ✓ | ✓ |
|  | Cinepak | ✓ | ✓ | ✓ | ✓ | ✓ | ✓ | ✓ |
| MPEG-1 | |  | ✓ | ✓ | ✓ | ✓ | ✓ | ✓ |
| MPEG-2 | |  | ✓ | ✓ | ✓ | ✓ | ✓ | ✓ |

| From | | 3GPP | | 3GPP2/K3G/AMC | | ISMA | AVI | | | |
|---|---|---|---|---|---|---|---|---|---|---|
|  |  | H.263 | MPEG-4 SP | H.263 | MPEG-4 SP | MPEG-4 SP | M-JPEG | MS-MPEG4 (V2.V3) | MPEG-4 | MPEG-1 |
| 3GPP | H.263 | ✓ | ✓ | ✓ | ✓ | ✓ | ✓ | ✓ | ✓ | ✓ |
|  | MPEG-4 SP | ✓ | ✓ | ✓ | ✓ | ✓ | ✓ | ✓ | ✓ | ✓ |
| 3GPP2/ K3G/AMC | H.263 | ✓ | ✓ | ✓ | ✓ | ✓ | ✓ | ✓ | ✓ | ✓ |
|  | MPEG-4 SP | ✓ | ✓ | ✓ | ✓ | ✓ | ✓ | ✓ | ✓ | ✓ |
| ISMA | MPEG-4 SP | ✓ | ✓ | ✓ | ✓ | ✓ | ✓ | ✓ | ✓ | ✓ |
| AVI | M-JPEG | ✓ | ✓ | ✓ | ✓ | ✓ | ✓ | ✓ | ✓ | ✓ |
|  | DIVX | ✓ | ✓ | ✓ | ✓ | ✓ | ✓ | ✓ | ✓ | ✓ |
|  | MS.RLE | ✓ | ✓ | ✓ | ✓ | ✓ | ✓ | ✓ | ✓ | ✓ |
|  | MS.MPEG4 | ✓ | ✓ | ✓ | ✓ | ✓ | ✓ | ✓ | ✓ | ✓ |
|  | MPEG4 | ✓ | ✓ | ✓ | ✓ | ✓ | ✓ | ✓ | ✓ | ✓ |
|  | Cinepak | ✓ | ✓ | ✓ | ✓ | ✓ | ✓ | ✓ | ✓ | ✓ |
| MPEG-1 | | ✓ | ✓ | ✓ | ✓ | ✓ | ✓ | ✓ | ✓ | ✓ |
| MPEG-2 | | ✓ | ✓ | ✓ | ✓ | ✓ | ✓ | ✓ | ✓ | ✓ |

This solution results in a video transcoding functionality integrated in the DF3/MF3. The Video Transcoding could perform the following conversions:
- Video-to-video
- Video-to-slideshow
- Video-to-image Other possible usages: audio transcoding, media filtering (e.g., only the audio of a video call, no images/clip in web pages or MMS), replacement of media content by compressed file archives.

To prevent unauthorized users the Content of Communication may be buffered in encrypted form. After sending the CC with lower QoS, it shall be ensured that the possible buffered contents are not altered by unauthorized entities. This can be done by commonly used techniques, like digital signatures. Besides, the HI3 Content of Communication sent to the agency with a lower QoS can serve itself as prove of the buffered contents integrity. The agency can use the same transcoding functionality to verify the integrity of the buffered contents. A prove is obtained if the same contents are obtained with the lower QoS. The idea is that the CC at lower QoS can serve as digital signature of the buffered CC at original QoS. When Agency shall retrieve the buffered CC, it could verify the integrity of such CC by applying on it the transcoding function and comparing the result with the CC at lower Qos. If they are equal, then the retrieved buffered CC is integral.

Receipt of low QoS Content of Communication reduces the storage amount needs in the situation where monitoring centre does not operate in real time. A filtering mechanism at DF3 premises could be optionally offered to make storage needs significantly lower.

Figure 5:
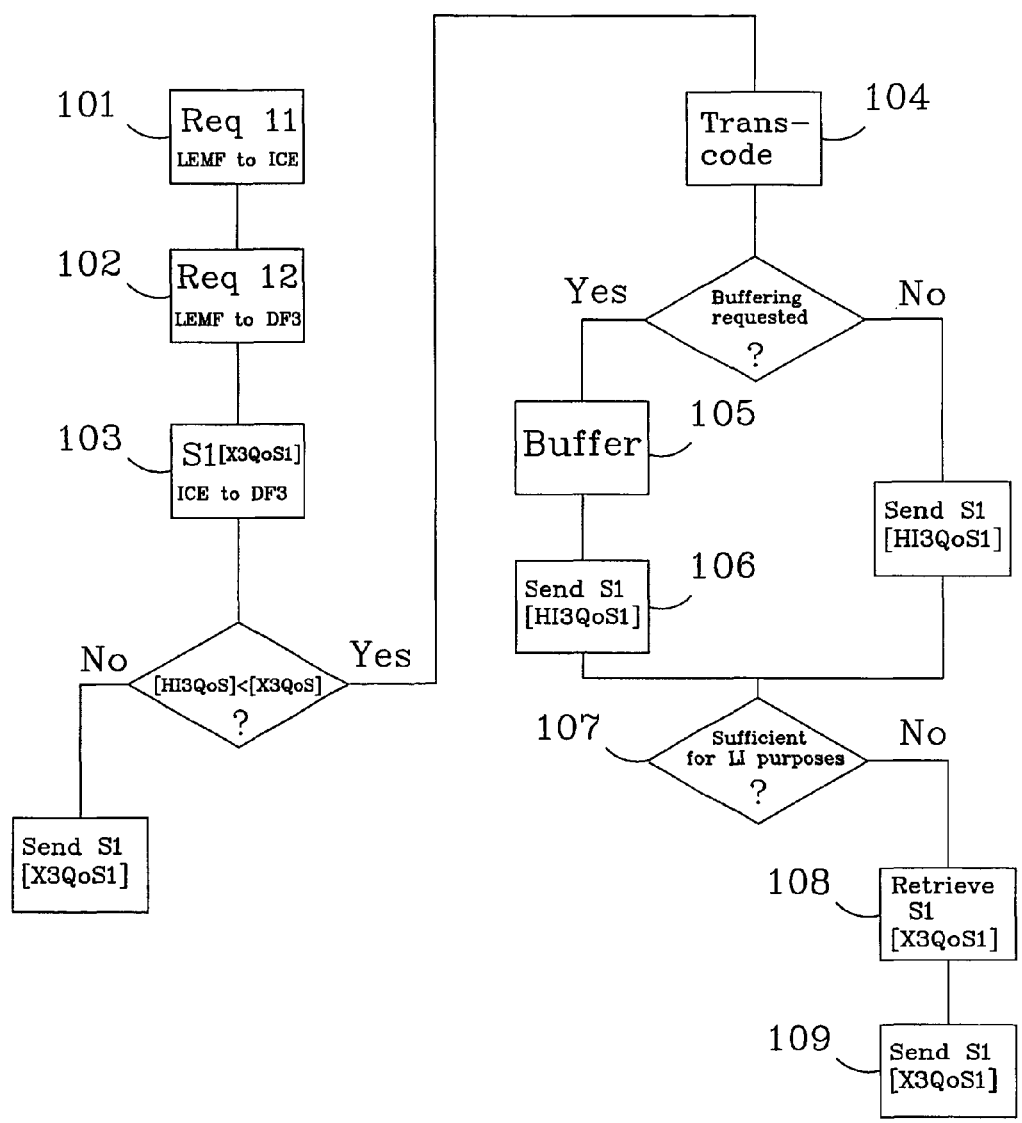
FIG. 5 disclose a flow chart illustrating some essential method steps of the invention.

FIG. 5 discloses a flowchart in which some important steps are shown. The flowchart is to be read together with the earlier shown figures. The flowchart comprises the following steps:
- The request 11 for Lawful Interception activation comprising target identity and service identity S1 is sent from LEMF to ICE. A block 101 discloses this step in FIG. 5.
- A QoS request 12 is received from LEMF to the MF3/DF3. The request 12 comprises beyond the target identity and the identities of service S1, a specification of the requested QoS [HI3QoS1] and also the buffering option "Buffering requested". A block 102 discloses this step in FIG. 5.
- The service S1 is forwarded with the original coded Quality of Services [X3QoS1] from the Packet Duplicator PD in ICE, to the Delivery Function DF3. A block 103 discloses this step in FIG. 5.
- The requested Quality of Services [HI3QoS1] is lower than the original Quality of Services [X3QoS1] and S1 is transcoded TC1 in the MF3/DF3 into the requested Quality of Services [HI3QoS1]. A block 104 discloses this step in FIG. 5.
- S1 with original Quality of Services [X3QoS1] is buffered BUFF1 in a MF3 database. A block 105 discloses this step in FIG. 5.
- S1 with requested Quality of Services [HI3QoS1] is sent from MF3/DF3 to LEMF. A block 106 discloses this step in FIG. 5.
- The agency finds the [HI3QoS1] to be not sufficient for interception purposes. A block 107 discloses this step in FIG. 5.
- A further request 13 is sent from LEMF to MF3/DF3. The buffered S1 with original Quality of Services [X3QoS1] is requested to be retrieved. A block 108 discloses this step in FIG. 5.
- The buffered S1 with original Quality of Services [X3QoS1] is sent on the HI3 from MF3/DF3 to LEMF. A block 109 discloses this step in FIG. 5.

Figure 6:
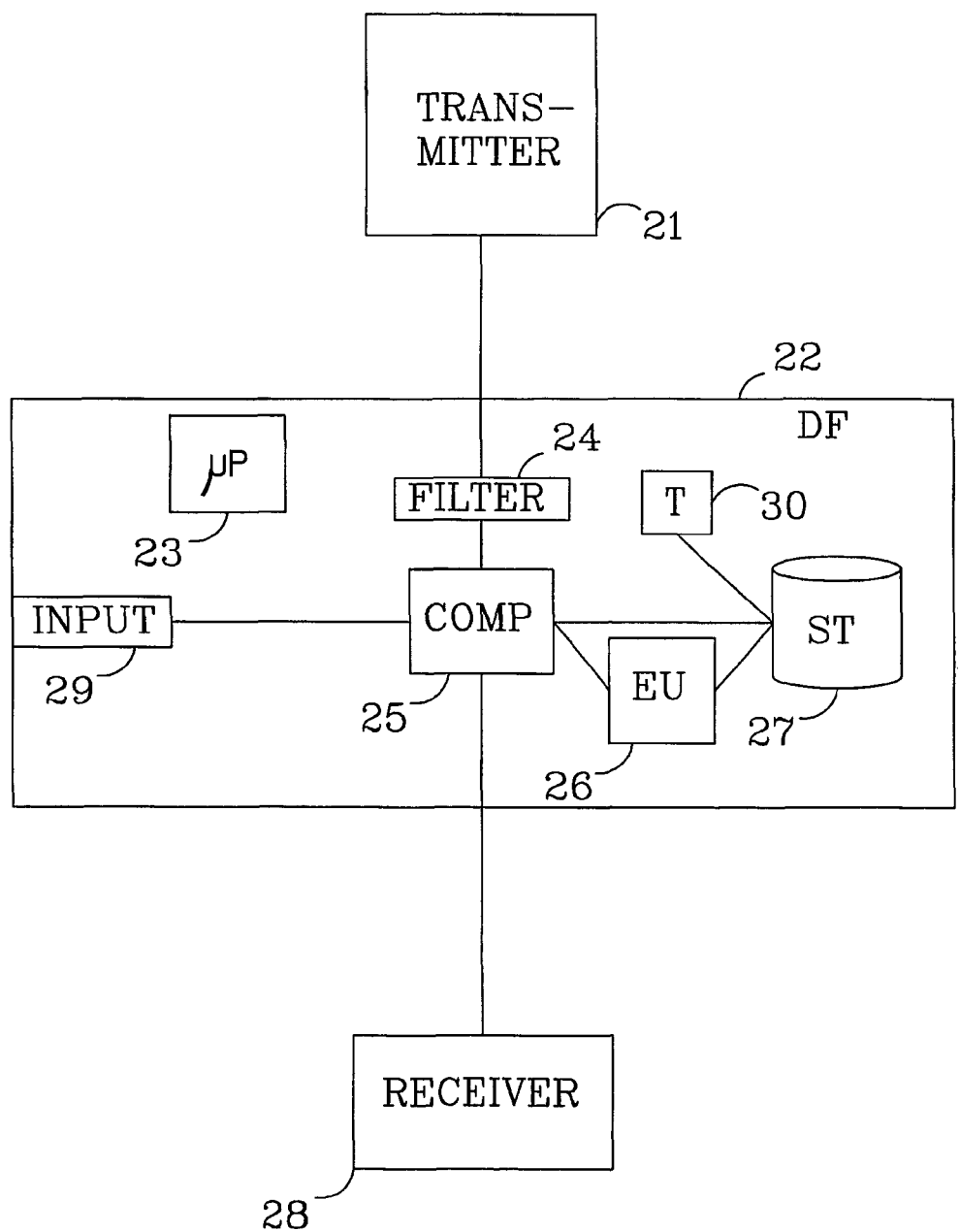
FIG. 6 discloses a block schematic illustration of a system that can be used to put the invention into practise.

An example of a system used to put the invention into practice is schematically shown in FIG. 6. The block schematic constellation corresponds to the one disclosed in FIGS. 2 and 3 but is by no means limited to these two examples. The system disclosed in FIG. 6 is not necessarily related to monitoring or Lawful Interception and can be used in any data transportation configuration. FIG. 6 discloses a delivery function 22 attached to a transmitter 21 and a receiver 28. Traffic, having originally coded QoS is transmitted from 21 to 22. The traffic will optionally arrive to a filter 24 that is used to filter undesired traffic. The delivery function 22 comprises an input 29 to which a specification of requested QoS will arrive. The traffic with originally coded QoS will be received by a comparator 25 used to compare original QoS value with requested QoS value. Traffic may optionally be sent to an Encryption Unit 26 and/or to storage 27 where traffic on request may be buffered. A timer 30 will optionally after lapse, drop the buffered traffic. In dependence of the result from the comparator 25, traffic with original or requested Qos will be forwarded from the deliver function 22 to the receiver 28. A processor unit 23 in delivery function 22 handles the control of traffic and entities within the DF.

Enumerated items are shown in the figures as individual elements. In actual implementations of the invention however, they may be inseparable components of other electronic devices such as a digital computer. Thus, actions described above may be implemented in software that may be embodied in an article of manufacture that includes a program storage medium. The program storage medium includes data signal embodied in one or more of a carrier wave, a computer disk (magnetic, or optical (e.g., CD or DVD, or both), non-volatile memory, tape, a system memory, and a computer hard drive.

The invention is not limited to the above described and in the drawings shown embodiments but can be modified within the scope of the enclosed claims. The systems and methods of the present invention may be implemented on any of the Third Generation Partnership Project (3GPP), European Telecommunications Standards Institute (ETSI), American National Standards Institute (ANSI) or other standard telecommunication network architecture.

The invention claimed is:

1. A method to enhance delivery capacity for traffic in a communication network, comprising the following steps:
   - receiving at an access point, a request to monitor traffic;
   - sending, from the access point to a Delivery Function, the requested monitored traffic with originally coded Quality of Services (QoS);
   - receiving at the Delivery Function, a specification of a requested QoS;
   - determining that the requested QoS is lower than the originally coded QoS;
   - transcoding the requested monitored traffic into the requested QoS.

2. The method according to claim 1 comprising the following further step:
   - receiving at a Delivery Function, a request to buffer the requested monitored traffic.

3. The method according to claim 1 comprising the following further step:
   - buffering, in the Delivery Function, the requested monitored traffic with the originally coded QoS.

4. The method according to claim 1 comprising the following further step:

forwarding to a receiving facility, the requested monitored traffic transcoded to the requested QoS.

5. The method according to claim 3 comprising the following further steps:
   detecting expiration of a specified time interval;
   dropping the buffered traffic.

6. The method according to claim 3 comprising the following further steps:
   receive at the Delivery Function, a request to drop the buffered traffic;
   dropping the buffered traffic.

7. The method according to claim 1 wherein the requested monitored traffic is encrypted before buffering.

8. The method according to claim 1 wherein requested monitored traffic is filtered at the Delivery Function premises.

9. A method to enhance delivery capacity for traffic in a communication network, comprising the following steps:
   receiving at a Delivery Function, traffic with originally coded Quality of Services (QoS);
   receiving at the Delivery Function, a specification of a requested QoS;
   determining that the originally coded QoS is higher than the requested QoS;
   transcoding the traffic into the requested QoS.

10. An apparatus used to enhance delivery capacity for traffic in a communication network, comprising:
    means for receiving at an access point, a request to monitor traffic;
    means for sending from the access point to a Delivery Function, the requested monitored traffic with originally coded Quality of Services (QoS);
    means for receiving at the Delivery Function, a specification of a requested QoS;
    means for establishing that the requested QoS is lower than the originally coded QoS;
    means for transcoding requested monitored traffic into the requested QoS.

11. The apparatus of claim 10 further comprising:
    means for receiving at the Delivery Function, a request to buffer the requested monitored traffic.

12. The apparatus of claim 10 further comprising:
    means for buffering, in the Delivery Function, the requested monitored traffic with the originally coded QoS.

13. The apparatus of claim 10, further comprising:
    means for forwarding to a receiving facility, the requested monitored traffic transcoded to the requested QoS.

14. The apparatus of claim 12 further comprising:
    means to detect expiration of a specified time interval;
    means for dropping the buffered traffic.

15. The apparatus of claim 12 further comprising:
    means for receiving at the Delivery Function, a request to drop the buffered traffic;
    means for dropping the buffered traffic.

16. The apparatus of claim 10 comprising means to encrypt the requested monitored traffic before buffering.

17. The apparatus of claim 10 comprising means to filter the requested monitored traffic.

18. A node in a communication network, comprising:
    means to receive requested traffic with originally coded Quality of Services (QOS)
    means to receive, a specification of a requested QoS;
    means to determine that the originally coded QoS is higher than the requested QoS;
    means for transcoding the requested traffic into requested QoS.

19. A non-transitory computer readable memory having stored thereon a plurality of instructions, the plurality of instructions which, when executed by a processor, cause the processor to perform the steps of a method for enhancing delivery capacity for traffic in a communication network, comprising:
    receiving, at a Delivery Function, traffic with originally coded Quality of Services (QoS);
    receiving, at the Delivery Function, a specification of a requested QoS;
    determining that the originally coded QoS is higher than the requested QoS;
    transcoding the traffic into the requested QoS.

* * * * *

UNITED STATES PATENT AND TRADEMARK OFFICE
CERTIFICATE OF CORRECTION

PATENT NO. : 8,107,480 B2  
APPLICATION NO. : 12/521704  
DATED : January 31, 2012  
INVENTOR(S) : Imbimbo et al.

Page 1 of 1

It is certified that error appears in the above-identified patent and that said Letters Patent is hereby corrected as shown below:

On the Face Page, in Field (73), under "Assignee", in Column 1, Line 2, delete "(PUBL)" and insert -- (PUBL), Stockholm (SE) --, therefor.

In Column 3, Line 27, delete "Qos" and insert -- QoS --, therefor.

In Column 3, Line 52, delete "Wherein" and insert -- wherein --, therefor.

In Column 3, Line 54, delete "disclose" and insert -- discloses --, therefor.

In Column 5, Line 36, delete "Subystems" and insert -- Subsystems --, therefor.

In Column 9, Line 27, delete "Qos." and insert -- QoS. --, therefor.

In Column 10, Line 22, delete "Qos" and insert -- QoS --, therefor.

In Column 12, Line 21, in Claim 18, delete "(QOS)" and insert -- (QoS); --, therefor.

Signed and Sealed this
Twenty-fourth Day of April, 2012

David J. Kappos
*Director of the United States Patent and Trademark Office*